(12) United States Patent
Nam et al.

(10) Patent No.: US 8,559,761 B2
(45) Date of Patent: Oct. 15, 2013

(54) METHOD AND APPARATUS FOR RESTORING SIGNAL USING MINIMUM VALUE SAMPLING

(75) Inventors: Dong-kyung Nam, Yongin-si (KR); Ho-joon Yoo, Seoul (KR); Sun-gi Hong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1865 days.

(21) Appl. No.: 11/797,888

(22) Filed: May 8, 2007

(65) Prior Publication Data
US 2008/0019470 A1    Jan. 24, 2008

(30) Foreign Application Priority Data

Jul. 18, 2006    (KR) ........................ 10-2006-0066979

(51) Int. Cl.
*G06K 9/32* (2006.01)
*H04L 7/00* (2006.01)

(52) U.S. Cl.
USPC .......................................... 382/300; 375/355

(58) Field of Classification Search
USPC .................. 382/300, 203, 100; 375/355, 326; 345/441, 428; 348/157, 169
See application file for complete search history.

(56) References Cited

U.S. PATENT DOCUMENTS

| | | | |
|---|---|---|---|
| 6,100,902 A | 8/2000 | Horikawa et al. | |
| 2003/0043270 A1 | 3/2003 | Rafey et al. | |
| 2006/0274872 A1* | 12/2006 | Ikeda et al. | 375/355 |

FOREIGN PATENT DOCUMENTS

| | | |
|---|---|---|
| JP | 2001-67465 | 3/2001 |
| JP | 2004-13797 | 1/2004 |

* cited by examiner

*Primary Examiner* — Yon Couso
(74) *Attorney, Agent, or Firm* — Staas & Halsey LLP

(57) ABSTRACT

Provided is an apparatus and method to restore a signal using minimum value sampling, more particularly, a signal restoring apparatus and method using minimum value sampling, which are capable of effectively preventing deterioration of a restored signal caused by aliasing occurring when minimum value sampling of an input signal is performed in order to restore a signal. The apparatus to restore a signal using the minimum value sampling includes a storage unit to store a sample value obtained through the minimum value sampling of an input signal in a predetermined sampling interval; a position determination unit to determine the position of the sample value in the sampling interval; and a restoration unit to restore the input signal using the stored sample value with respect to the determined position.

39 Claims, 24 Drawing Sheets

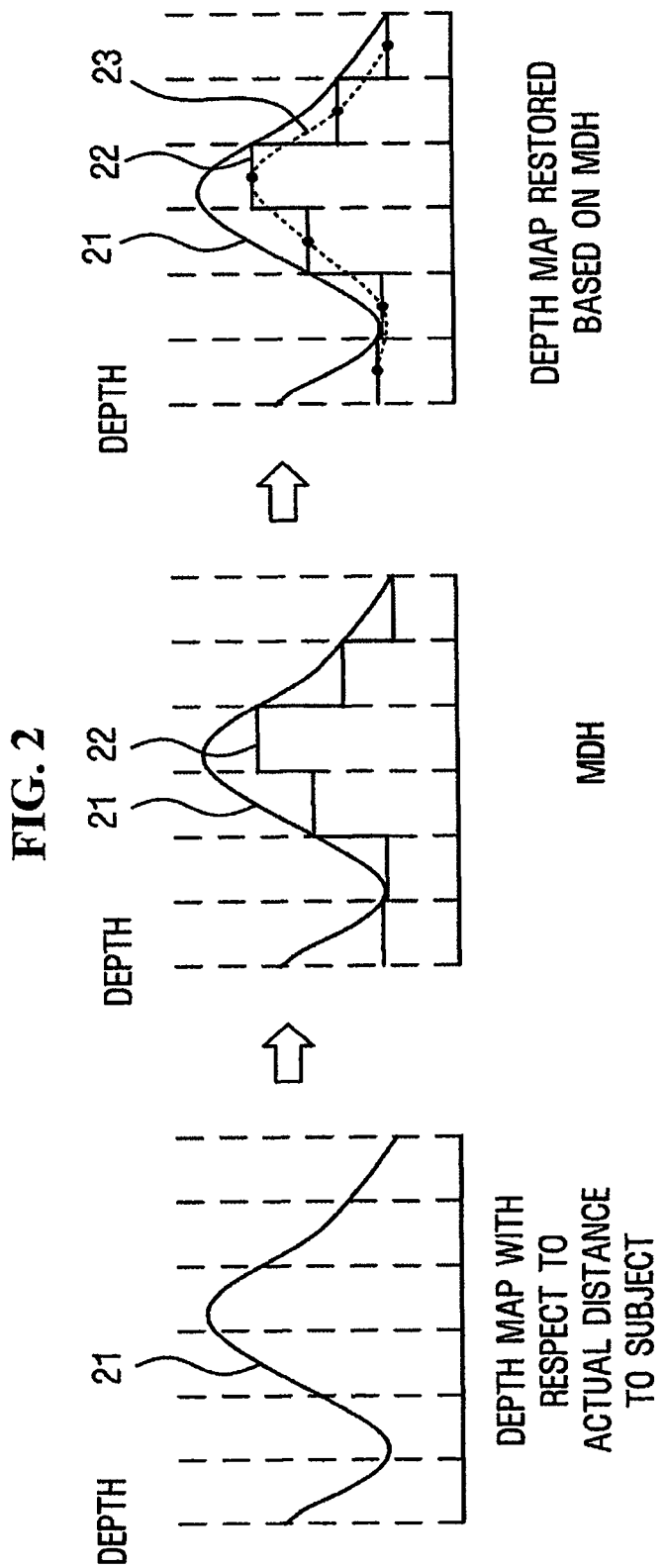

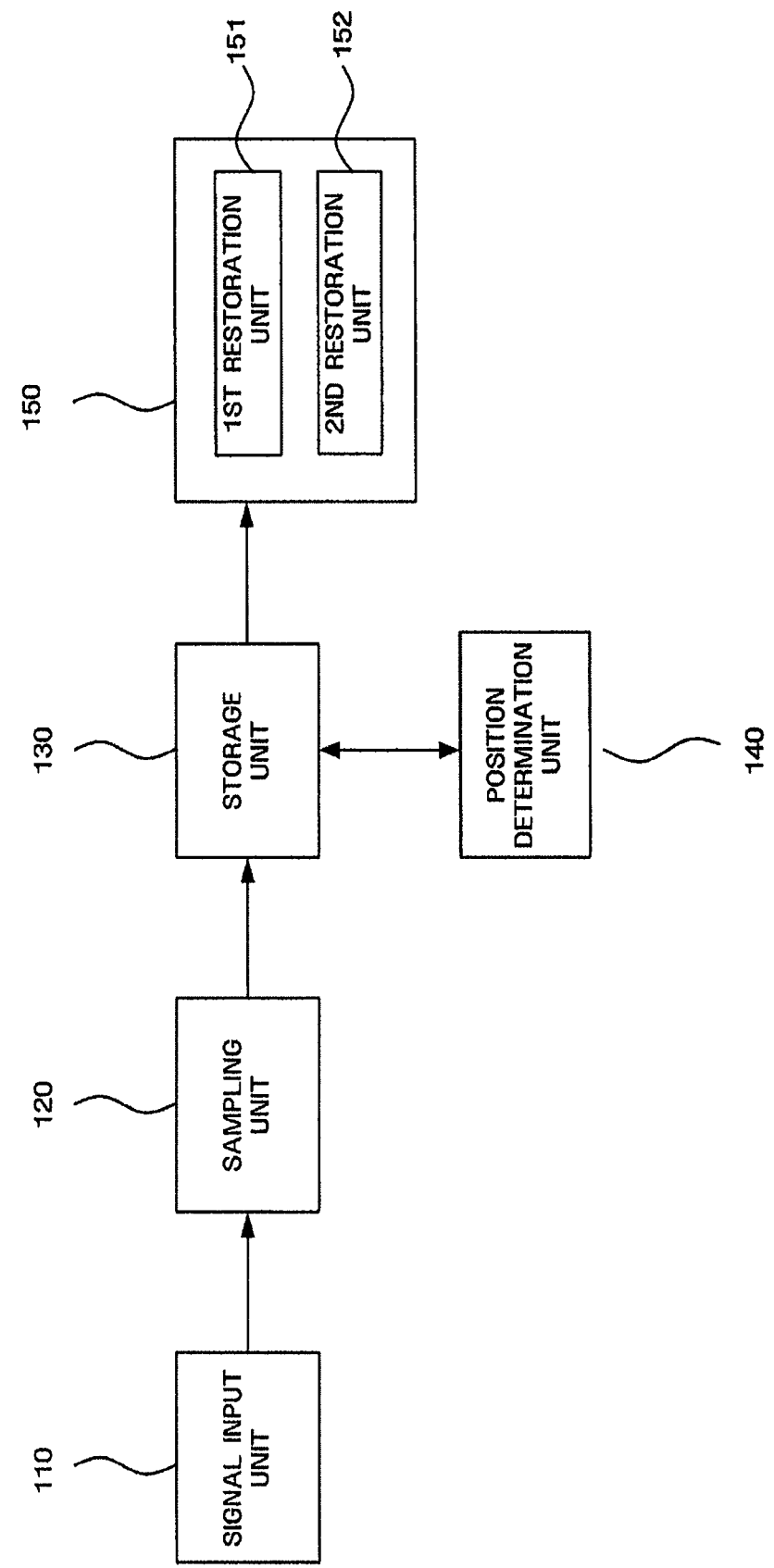

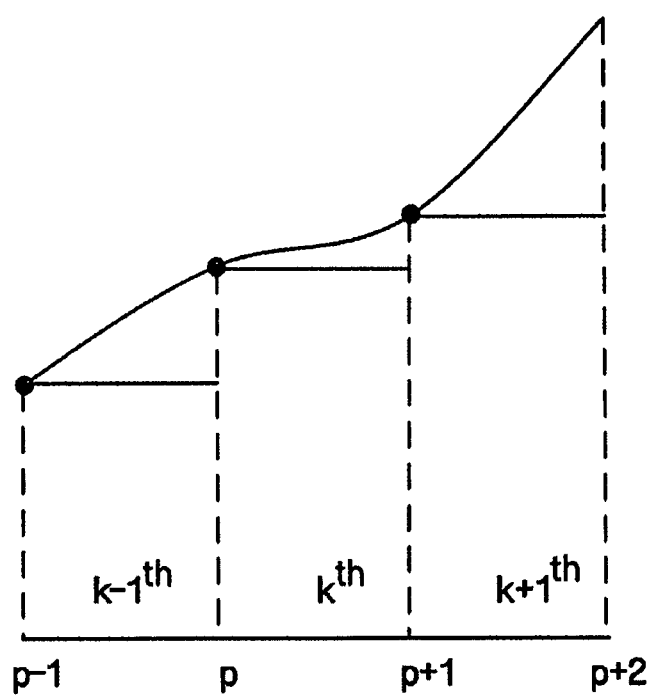

CONDITION:
d(k−1)>d(k)>d(k+1)

POSITION OF SAMPLE:
S(k)=p+1

CONDITION:
d(k-1)>d(k)<d(k+1)

POSITION OF SAMPLE:
$$s(k) = p + \frac{\sqrt[n]{d(k-1)-d(k)}}{\sqrt[n]{d(k-1)-d(k)} + \sqrt[n]{d(k+1)-d(k)}}$$

CONDITION:
d(k−1)<d(k)>d(k+1)

POSITION OF SAMPLE:
$$s(k) = \begin{cases} p, & \text{if } d(k-1) < d(k+1) \\ p+1, & \text{otherwise} \end{cases}$$

CONDITION:
d(k−1)=d(k)>d(k+1)

POSITION OF SAMPLE:
S(k)=p+1

CONDITION:
d(k-1)=d(k)<d(k+1)

POSITION OF SAMPLE:
S(k)=p

CONDITION:
d(k-1)>=d(k)

POSITION OF SAMPLE:
S(k)=p+1

CONDITION:
d(k-1)<d(k)

POSITION OF SAMPLE:
S(k)=p

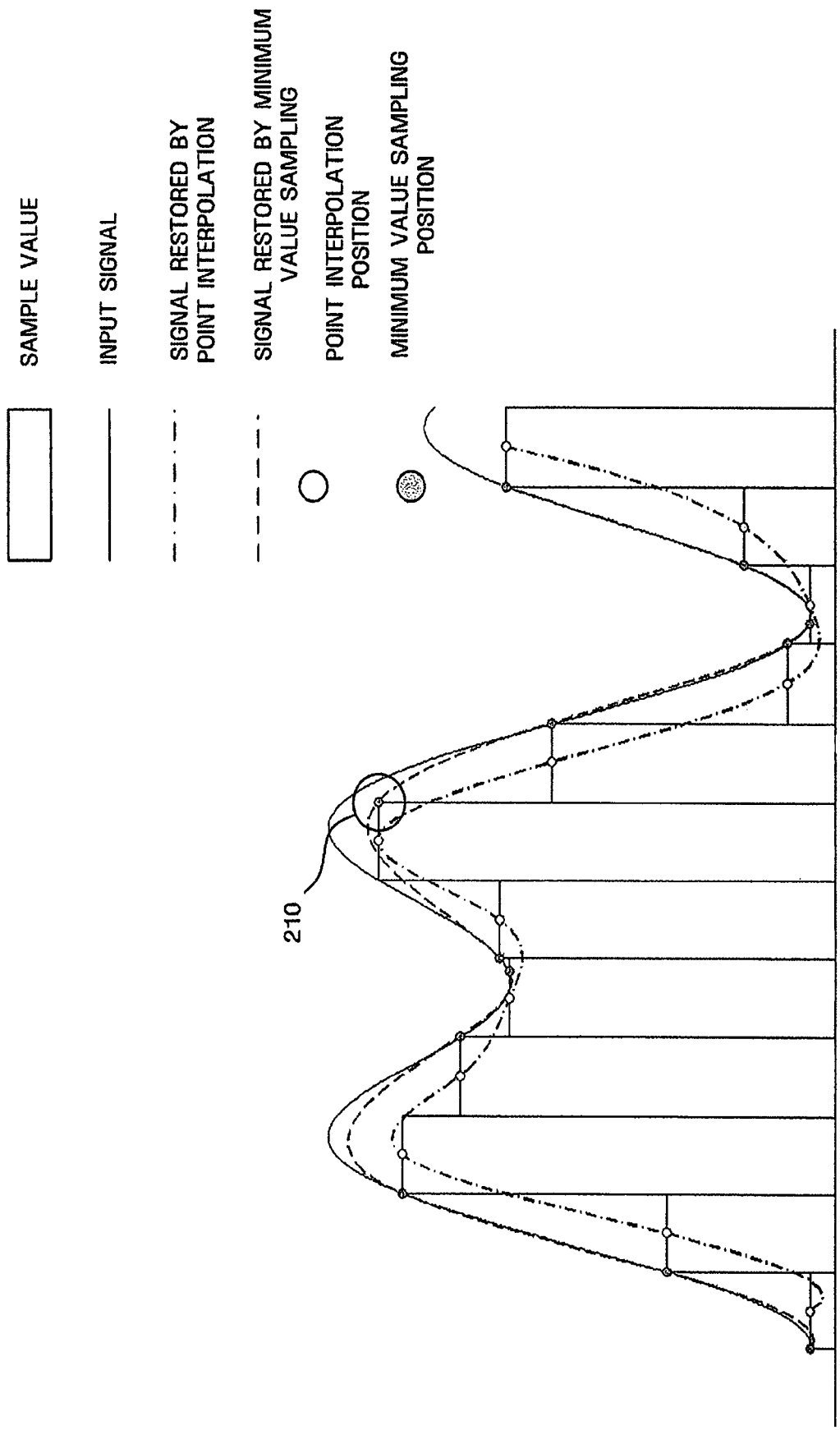

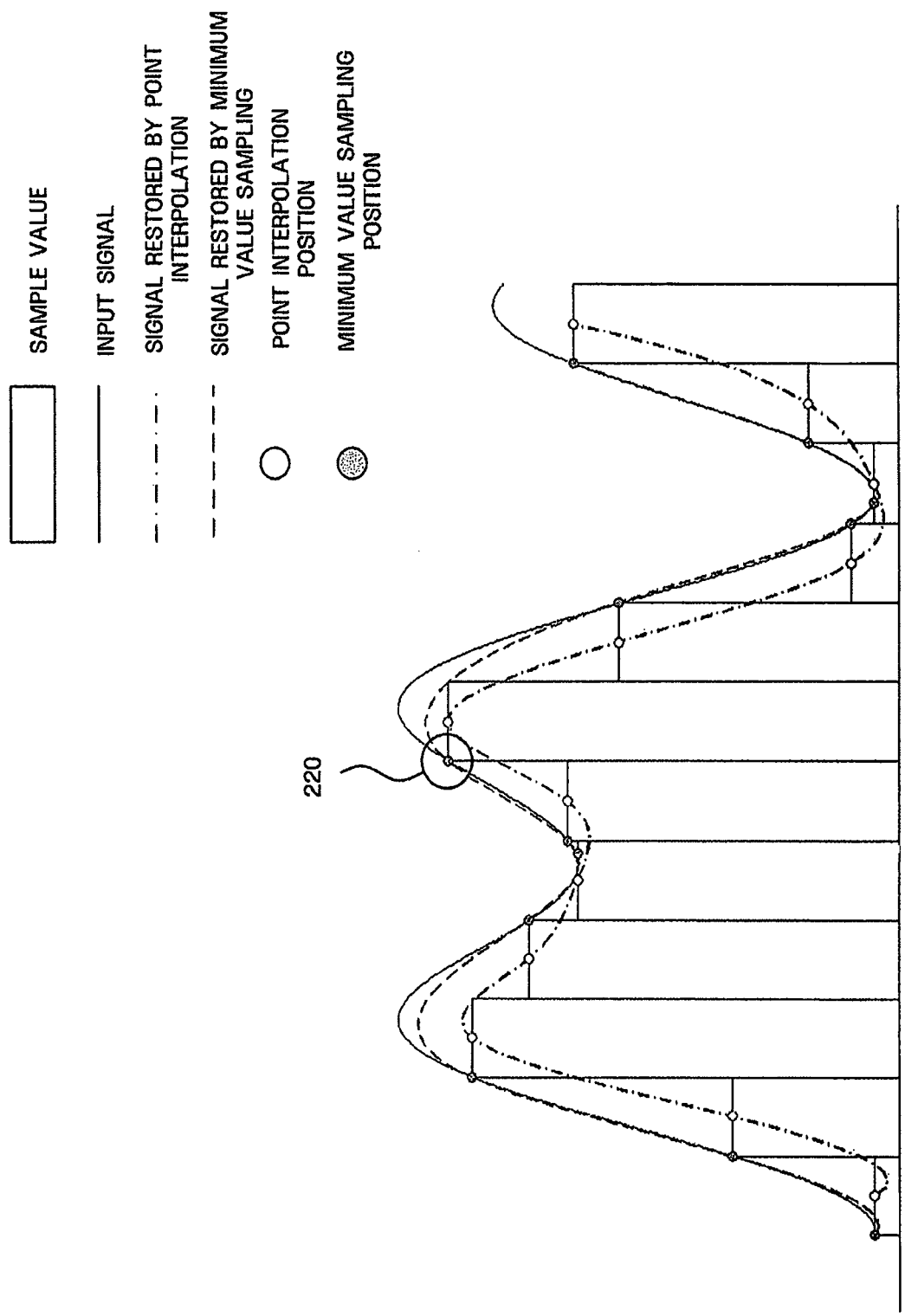

FIG. 22A

| | (i+1, j) | | |
|---|---|---|---|
| (i, j−1) | (i, j) | (i, j+1) | |
| | (i−1, j) | | |
| | | | |

| | | | |
|---|---|---|---|
| j−1 | j | j+1 | |
| | | | |
| | | | |

DETERMINE SAMPLE
POSITION WITH RESPECT
TO COLUMNS

DETERMINE SAMPLE
POSITION WITH RESPECT
TO ROWS

DETERMINE SAMPLE
POSITION AT INTERVAL
(i,j)

METHOD AND APPARATUS FOR RESTORING SIGNAL USING MINIMUM VALUE SAMPLING

CROSS-REFERENCE TO RELATED APPLICATIONS

This application claims priority from Korean Patent Application No. 10-2006-0066979 filed on Jul. 18, 2006 in the Korean Intellectual Property Office, the disclosure of which is incorporated herein by reference in its entirety.

BACKGROUND OF THE INVENTION

1. Field of the Invention

The present invention relates to an apparatus and method to restore a signal using minimum value sampling, and more particularly, to a signal restoring apparatus and method using minimum value sampling, which are capable of effectively preventing deterioration of a restored signal caused by aliasing occurring when minimum value sampling of an input signal is performed in order to restore a signal.

2. Description of the Related Art

In general, a depth mapping apparatus is an apparatus recording spatial depth and distance information of a subject in units of pixels, unlike a camera. In other words, while an ordinary camera records an image by recording the intensity of a subject with respect to each pixel, the depth mapping apparatus records a distance to the subject with respect to each pixel.

A method that is most widely used in order to record a depth map is radiating light to a subject and measuring a time of flight (TOF) that is taken by the light to return after being reflected by the subject. The depth mapping apparatus measures a time taken by the light reflected by the subject to arrive at a photo detector with respect to each pixel. Here, if a plurality of rays is returning to a pixel of the photo detector after being reflected by the subject, the depth mapping apparatus chooses a ray having a shortest TOF to determine a distance from the pixel to the subject.

More specifically, as illustrated in FIG. 1A, a depth mapping apparatus 11 radiates light 13 to a subject 12, and when the radiated light 13 is reflected by the subject 12 and returns, the depth mapping apparatus 11 selects a ray having a shortest TOF to determine a distance to the subject 12 from the pixel. The selected distance is referred to as a minimum distance sample (MDS) or a minimum value sample (MVS). As illustrated in FIG. 1B, a minimum distance of a hull surrounding the subject 12, which will be abbreviated to an MDH, is obtained from the MDS or MVS of each pixel.

Meanwhile, from sample values sampled through the minimum distance sampling or minimum value sampling, the depth mapping apparatus 11 can generate a spatial model in relation to the subject 12. Here, as illustrated in FIG. 2, in a process of generating a spatial model of the subject 12 using the depth mapping apparatus 11, first, minimum distance sampling or minimum value sampling of a depth map 21 with respect to the actual distance to the subject 12 is performed and thus an MDH 22 is obtained.

Also, when the depth mapping apparatus 11 generates a spatial model of the subject 12, a depth map 23 is restored through the obtained MDH 22. Here, the depth map 23 is restored to have values shorter than actual distance values to the subject 12. This is because aliasing, such as a staircase phenomenon, occurs when the MDH 22 is obtained through minimum distance sampling or minimum value sampling. This aliasing can be a critical defect when a depth map is restored, and in order to compensate for this aliasing, a restored depth map requires further restoration. In order to reduce this aliasing, a method of increasing the resolution of the depth mapping apparatus 11 is used.

If the resolution of the depth mapping apparatus 11 is increased, the aliasing phenomenon decreases but the staircase phenomenon occurs due to the principle of operation. Accordingly, increasing the resolution is not a fundamental solution. Accordingly, a method used by the depth mapping apparatus 11 to restore a depth map using sample values considering the aliasing phenomenon is needed.

Japanese Patent Laid-Open Publication No. 2001-067465 discloses an interpolation method to obtain interpolation data by performing second sampling after obtaining discrete data through first sampling of convex discrete data. Though the method provides a method of obtaining interpolation data by generating integrated values, mean values, and approximate values of convex data in intervals of second sampling, a method of preventing deterioration occurring due to the aliasing phenomenon when a depth map is restored has not been suggested yet.

SUMMARY OF THE INVENTION

Additional aspects and/or advantages of the invention will be set forth in part in the description which follows and, in part, will be apparent from the description, or may be learned by practice of the invention.

The present invention provides an apparatus and method of restoring a signal using minimum value sampling, which is capable of preventing deterioration due to an aliasing phenomenon by determining the position of a sample value obtained in a predetermined sampling interval when minimum value sampling of an input signal is performed.

According to an aspect of the present invention, there is provided an apparatus to restore a signal using the minimum value sampling, the apparatus including a storage unit storing sample values obtained through the minimum value sampling of an input signal in predetermined sampling intervals; a position determination unit determining the positions of the sample values in the sampling intervals; and a restoration unit restoring the input signal using the stored sample values with respect to the determined positions.

According to another aspect of the present invention, there is provided a method of restoring a signal using minimum value sampling comprising: storing a sample value obtained through the minimum value sampling in a predetermined sampling of an input signal interval; determining the position of the sample value in the sampling interval; and restoring the input signal using the stored sample value with respect to the determined position.

BRIEF DESCRIPTION OF THE DRAWINGS

The above and other features and advantages of the present invention will become more apparent by describing in detail an exemplary embodiment thereof with reference to the attached drawings, in which:

FIG. 2 illustrates a method of restoring a signal using an MDH according to a conventional technology;

FIG. 3 is a block diagram illustrating an apparatus to restore a signal using minimum value sampling according to an embodiment of the present invention;

FIGS. 4 through 12 illustrate a method of determining a sampling position through changes in the magnitude of sample values in sampling intervals (k−1), k and (k+1) according to an embodiment of the present invention;

FIG. 20 illustrates a signal restored by a first restoration unit according to an embodiment of the present invention;

FIG. 21 illustrates a restored signal in which an error in the signal is corrected by a second restoration unit according to an embodiment of the present invention;

FIG. 22A through D illustrate a method of determining a sampling position on a 2-dimensional (2D) plane according to an embodiment of the present invention.

DETAILED DESCRIPTION OF THE PREFERRED EMBODIMENTS

Figure 1A:
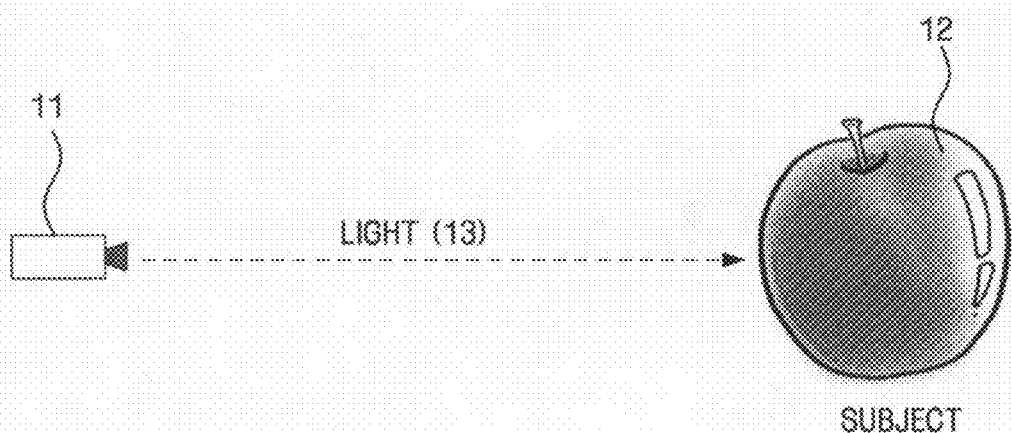
FIG. 1A and FIG. 1B illustrate a conventional minimum value sampling method.
Figure 1B:
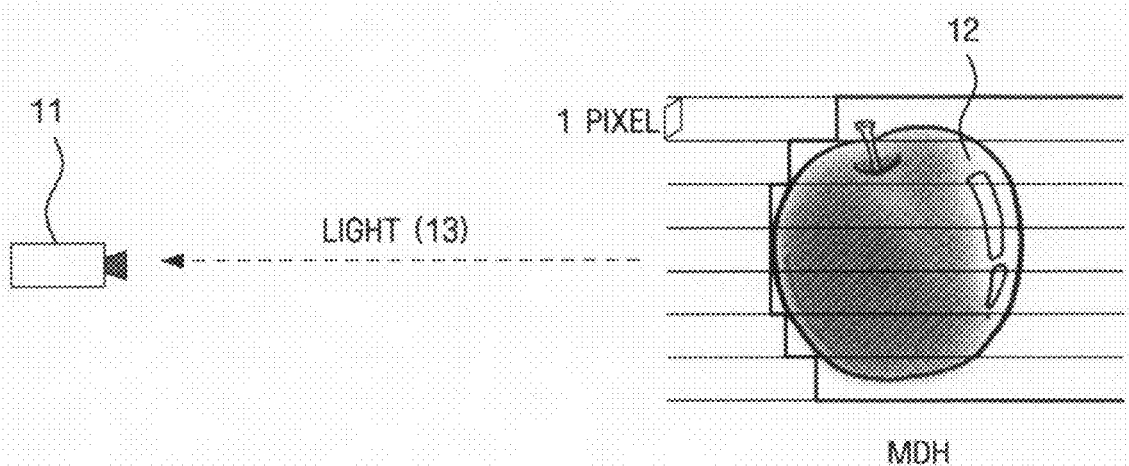

Reference will now be made in detail to the embodiments of the present invention, examples of which are illustrated in the accompanying drawings, wherein like reference numerals refer to the like elements throughout. The embodiments are described below to explain the present invention by referring to the figures.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. The present invention will now be described more fully with reference to the accompanying drawings, in which an exemplary embodiment of the invention is shown.

An apparatus and method of restoring a signal using minimum value sampling according to the invention will be described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means to implement the functions/acts specified in the block or blocks. These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps to implement the functions/acts specified in the block or blocks.

In addition, each block may represent a module, a segment, or a portion of code, which may comprise one or more executable instructions to implement the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

FIG. 3 is a block diagram illustrating an apparatus 100 to restore a signal using minimum value sampling according to an embodiment of the present invention.

As illustrated in FIG. 3, the apparatus 100 to restore a signal using minimum value sampling may be composed of a signal input unit 110 to input a predetermined signal, a sampling unit 120 to perform minimum value sampling in each predetermined interval, a storage unit 130 to store sample values obtained through the sampling, a position determination unit 140 to determine the position of a sample value in a predetermined sampling interval, and a restoration unit 150 to restore an input signal through the determined position according to an aspect of the present invention.

The apparatus 100 to restore a signal using minimum value sampling may store sample values obtained by sampling a spatial depth of a subject or distance information with respect to each pixel and generate a spatial model of the subject from the stored sample values.

When light is radiated to the subject, a signal on a spatial depth or distance information of the subject based on a time of flight (TOF) taken by the light to return after being reflected by the subject can be input to the signal input unit 110.

The sampling unit 120 can perform minimum value sampling of the signal input through the signal input unit 110 with respect to each predetermined sampling interval. Here, minimum value sampling (MVS) can be understood as minimum distance sampling (MDS), and means sampling of a ray having a shortest TOF when signals corresponding to a plurality of rays having different TOFs with respect to a predetermined sampling interval (for example, a pixel) are input through the signal input unit 110.

Accordingly, a minimum distance of a hull surrounding the subject, which is abbreviated to an MDH, can be obtained from sample values obtained by the sampling unit 120 through minimum value sampling, and this MDH can be stored in the storage unit 130. According to an embodiment of the present invention, the storage unit 130 may include devices such as a cache, a ROM, a PROM, an EPROM, an EEPROM, a flash memory, an SRMA and a DRAM, but is not limited to these devices.

The position determination unit 140 may determine the position where a sample value is sampled in a predetermined sampling interval. For example, if sampling interval k is formed of p through (p+1) and a sample value d(k) is obtained in sampling interval k, the sampling position at which d(k) is obtained can be determined. In other words, the position at which d(k) is obtained can be determined from among p through (p+1).

In one embodiment of the present invention, when sampling interval k is disposed between sampling intervals k−1 and k+1, the position determination unit 140 can determine a position where the sample value d(k) is obtained, by changing the magnitude of the sample value d(k) obtained in sampling interval k and the magnitudes of sample values d(k−1) and d(k+1) obtained in sampling intervals (k−1) and (k+1).

FIGS. 4 through 12 illustrate positions of sample values with respect to various types of input signals according to an embodiment of the present invention. In FIGS. 4 through 12 the start position of sampling interval k is p and the end position is (p+1). Accordingly, the interval of sampling interval k may be formed between p and (p+1). Also, s(k) indicates a position in sampling interval k at which the sample value d(k) is obtained.

FIG. 4 illustrates a case where an input signal is increasing, in which the relation d(k−1)<d(k)<d(k+1) holds true. Accordingly, in sampling interval k, position s(k) where sample value d(k) is obtained is p.

Figure 5:
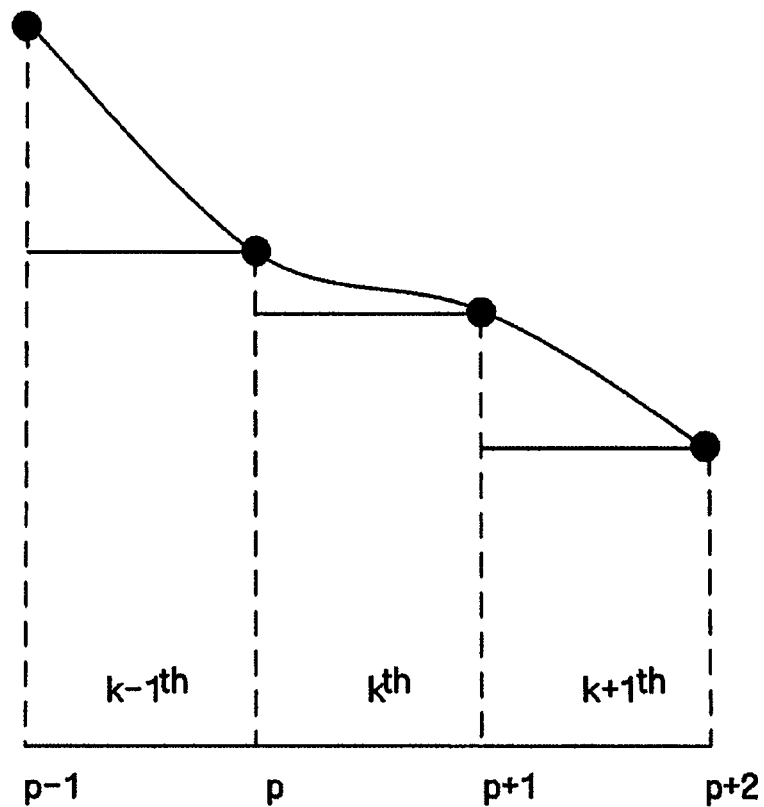

FIG. 5 illustrates a case where an input signal is decreasing, in which the relation d(k−1)>d(k)>d(k+1) holds true. Accordingly, in sampling interval k, position s(k) where sample value d(k) is obtained is (p+1).

Figure 6:
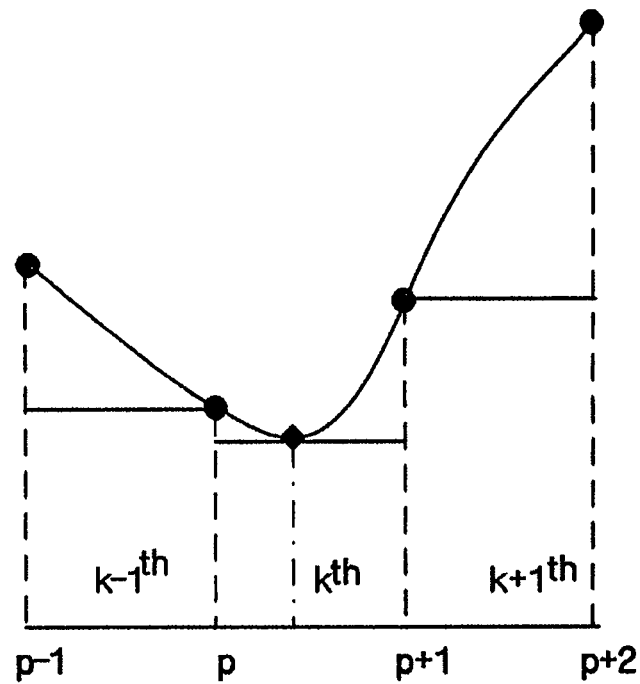

FIG. 6 illustrates a case where an input signal is convex, and position s(k) where sample value d(k) is obtained in sampling interval k, occurs in sampling interval k, that is, p through (p+1). If the input signal is convex, in order to find position s(k) where sample value d(k) is obtained, the position of sample value d(k) may be determined by assuming that the input signal is a linear model, a second-order model, etc.

Figure 13:
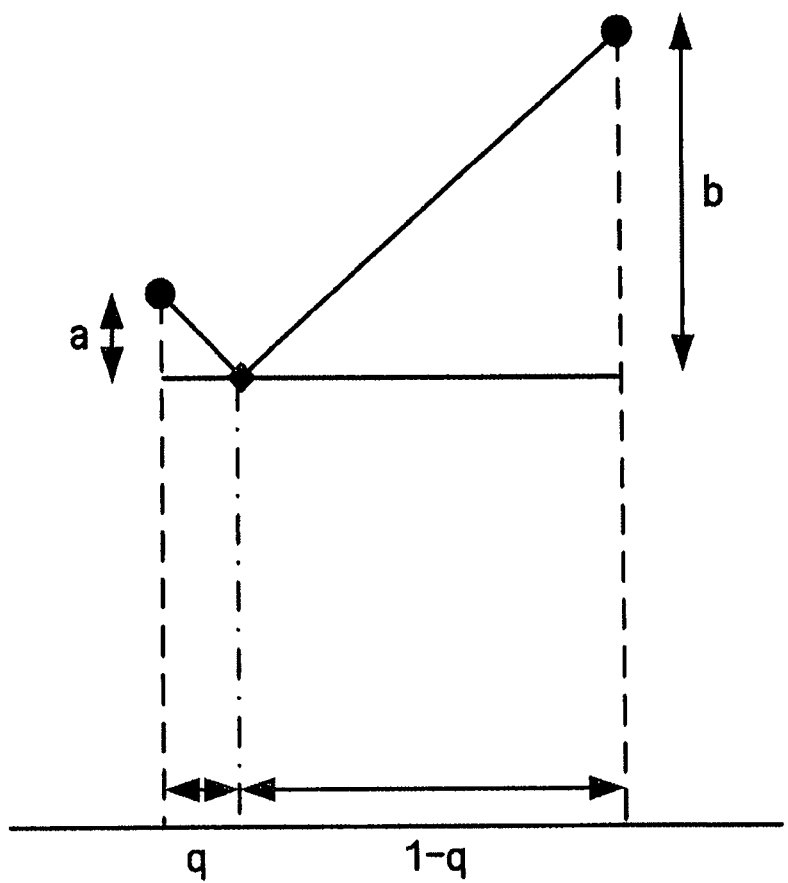
FIG. 13 illustrates a method of determining a sampling position through a linear model when sample values in sampling intervals (k−1), k and (k+1) show a convex shape according to an embodiment of the present invention.

For example, if the input signal is a linear sampling model, assuming that the difference between sample value d(k−1) of sampling interval (k−1) and sample value d(k) of sampling interval k is a, the difference between sample value d(k) of sampling interval k and sample value d(k+1) of sampling interval (k+1) is b, the distance ratio of the distance from p to the position where sample value d(k) is obtained is q, the distance ratio of the distance from the position where sample value d(k) is obtained to (p+1) is (1−q), and a sample value d(k) is symmetrical with respect to its position, as illustrated in FIG. 13, it can be seen that position s(k) where sample value d(k) is obtained is $$s(k) = p + \frac{d(k-1) - d(k)}{d(k-1) - d(k) + d(k+1) - d(k)}$$

from equation 1 below:

$$a:b = q:1-q \quad (1)$$
$$bq = a - aq$$
$$q = a/(a+b)$$
$$s(k) = p + \frac{d(k-1) - d(k)}{d(k-1) - d(k) + d(k+1) - d(k)}$$

Figure 14:
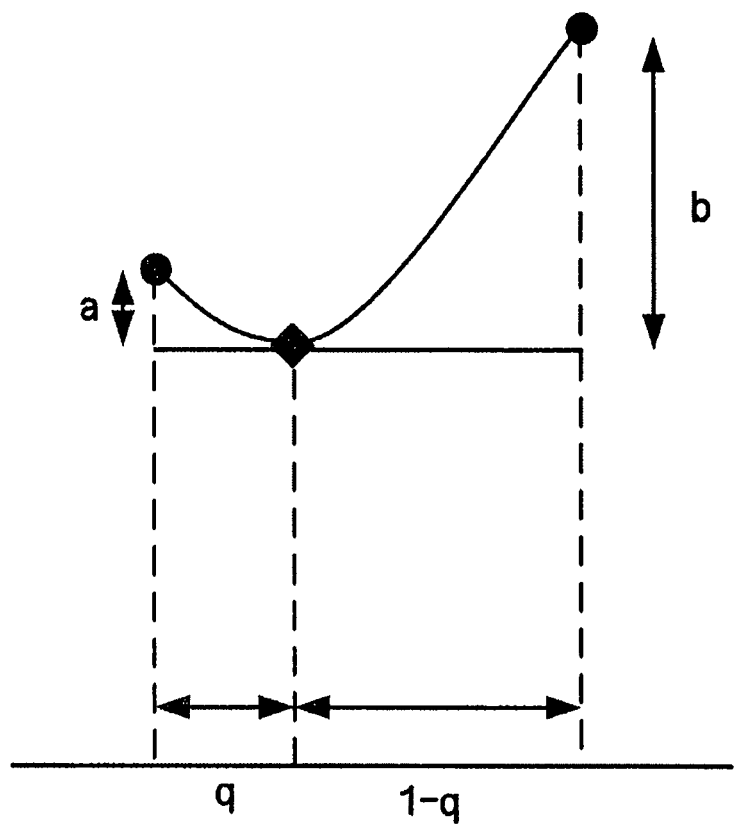
FIG. 14 illustrates a method of determining a sampling position through a second-order model when sample values in sampling intervals (k−1), k and (k+1) show a convex shape according to an embodiment of the present invention.

Meanwhile, if the input signal is a second-order sampling model, assuming that the difference between sample value d(k−1) of sampling interval (k−1) and sample value d(k) of sampling interval k is a, the difference between sample value d(k) of sampling interval k and sample value d(k+1) of sampling interval (k+1) is b, the distance ratio of the distance from p to the position where sample value d(k) is obtained is q, the distance ratio of the distance from the position where sample value d(k) is obtained to (p+1) is (1−q), and sample value d(k) is symmetrical with respect to its position, as illustrated in FIG. 14, it can be seen that position s(k) where sample value d(k) is obtained is $$s(k) = p + \frac{\sqrt{d(k-1) - d(k)}}{\sqrt{d(k-1) - d(k)} + \sqrt{d(k+1) - d(k)}}$$

from equation 2 below:

$$f(x) = \alpha(x-q)^2 \quad (2)$$
$$f(0) = a, \alpha q^2 = a$$
$$f(0) = b, \alpha(1-q)^2 = b$$
$$\frac{q^2}{(1-q)^2} = \frac{a}{b}, q = \frac{\sqrt{a}}{\sqrt{a} + \sqrt{b}}$$
$$s(k) = p + q = p + \frac{\sqrt{d(k-1) - d(k)}}{\sqrt{d(k-1) - d(k)} + \sqrt{d(k+1) - d(k)}}$$

Accordingly, from the linear sampling model and the second-order sampling model described above, if the input signal is convex, position s(k) of sample value d(k) obtained in sampling interval k can be generalized as $$s(k) = p + q = p + \frac{\sqrt[n]{a}}{\sqrt[n]{a} + \sqrt[n]{b}} = p + \frac{\sqrt[n]{d(k-1) - d(k)}}{\sqrt[n]{d(k-1) - d(k)} + \sqrt[n]{d(k+1) - d(k)}}.$$

Figure 7:
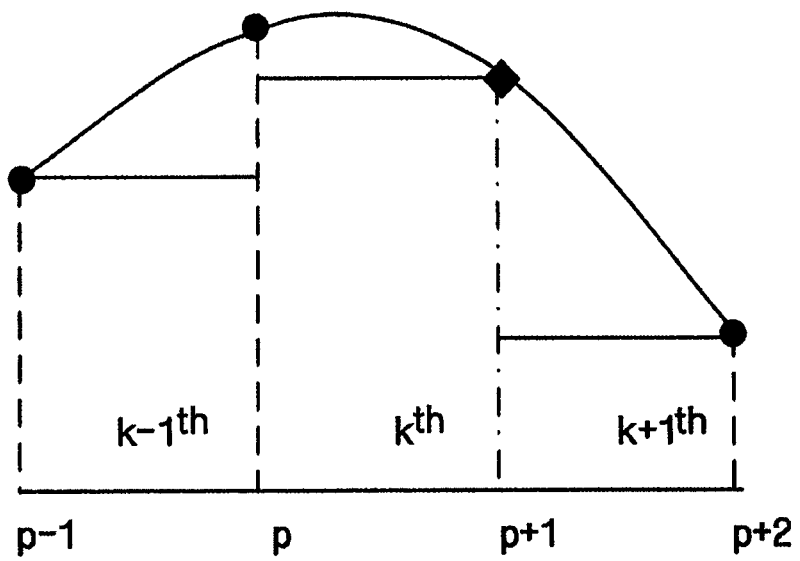
Figure 8:
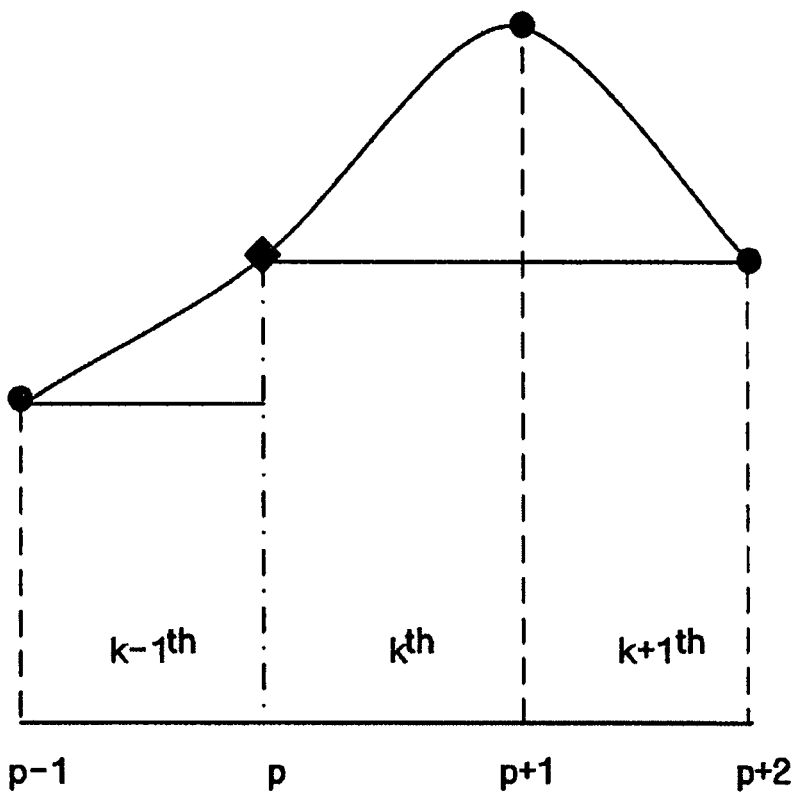
Figure 9:
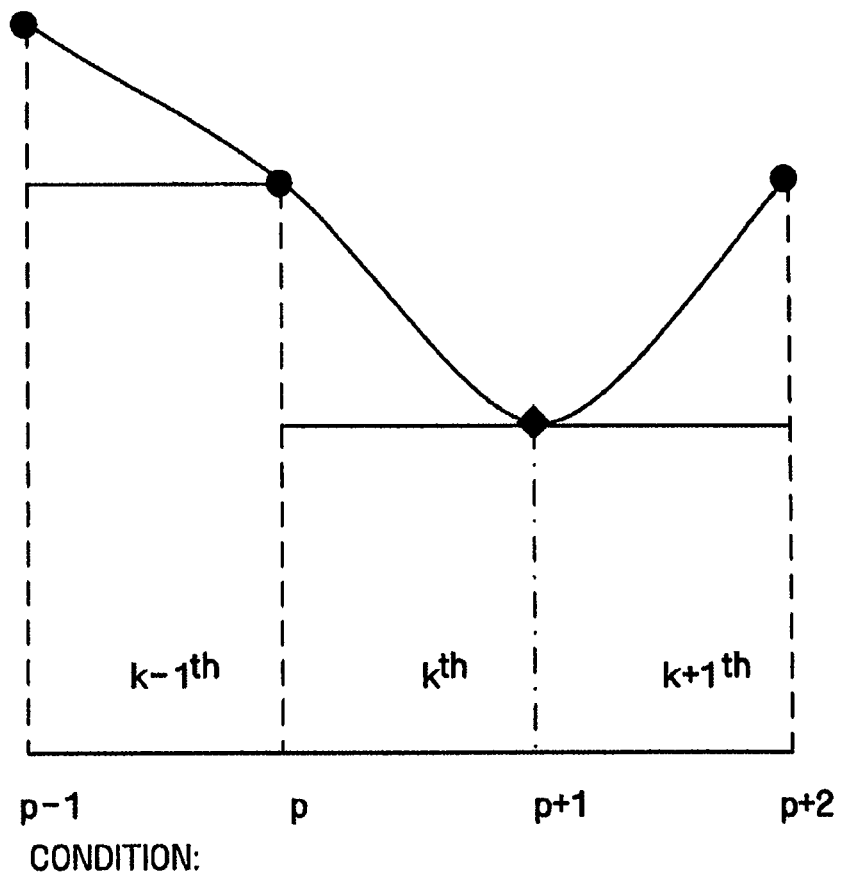
Figure 10:
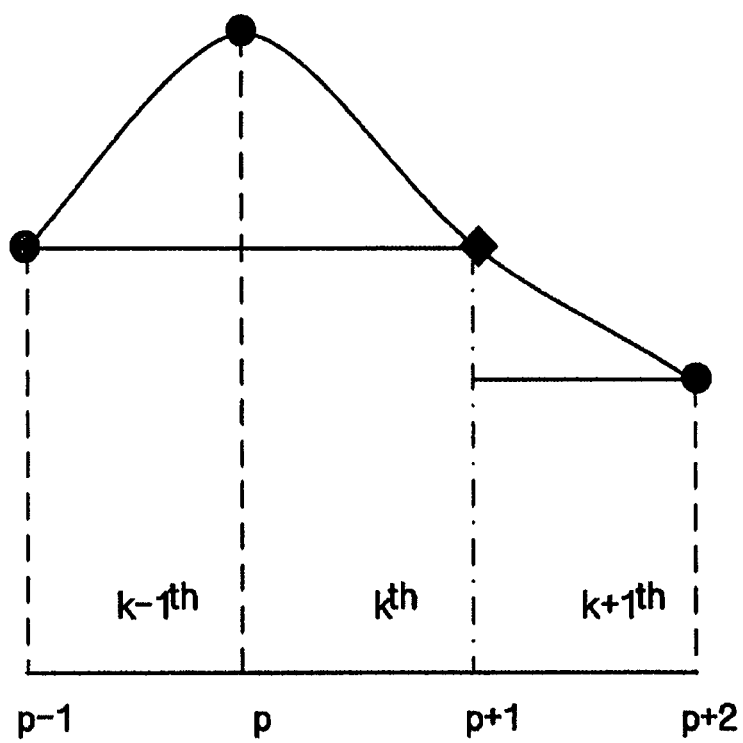
Figure 11:
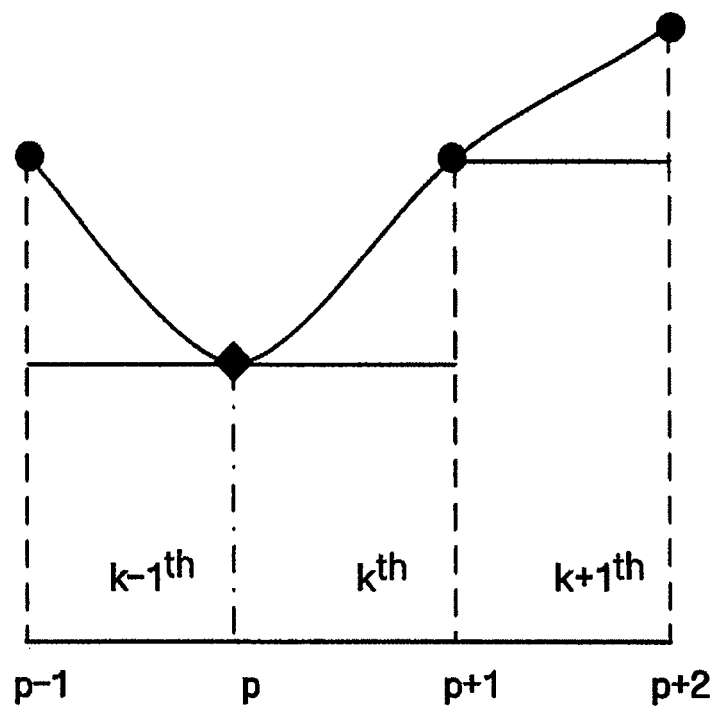
Figure 12:
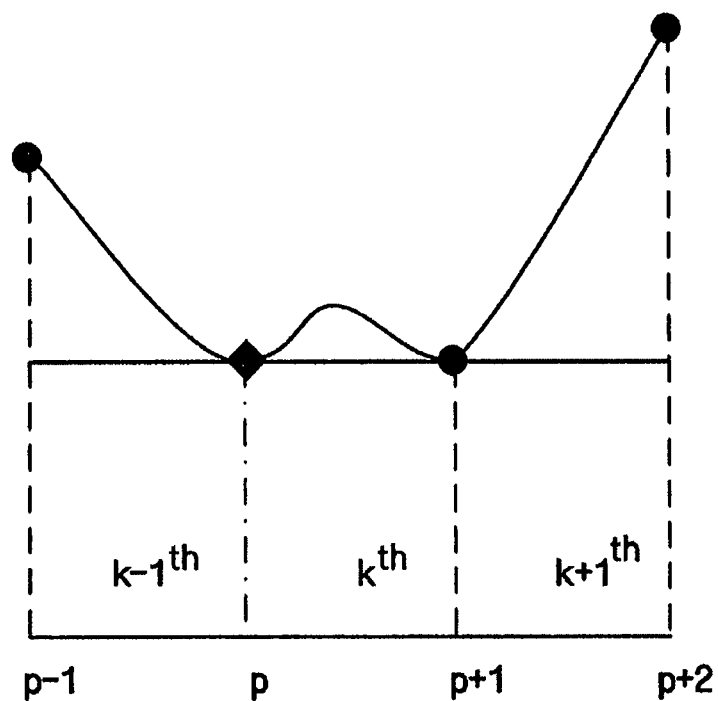

FIG. 7 illustrates a case where an input signal is concave, and position s(k) where sample value d(k) is obtained in sampling interval k is positioned at p or (p+1), but it is not determined at which of p and (p+1) s(k) is positioned. To achieve this, assuming that the input signal is symmetrical, position s(k) where sample value d(k) is obtained can be determined.

Figure 15:
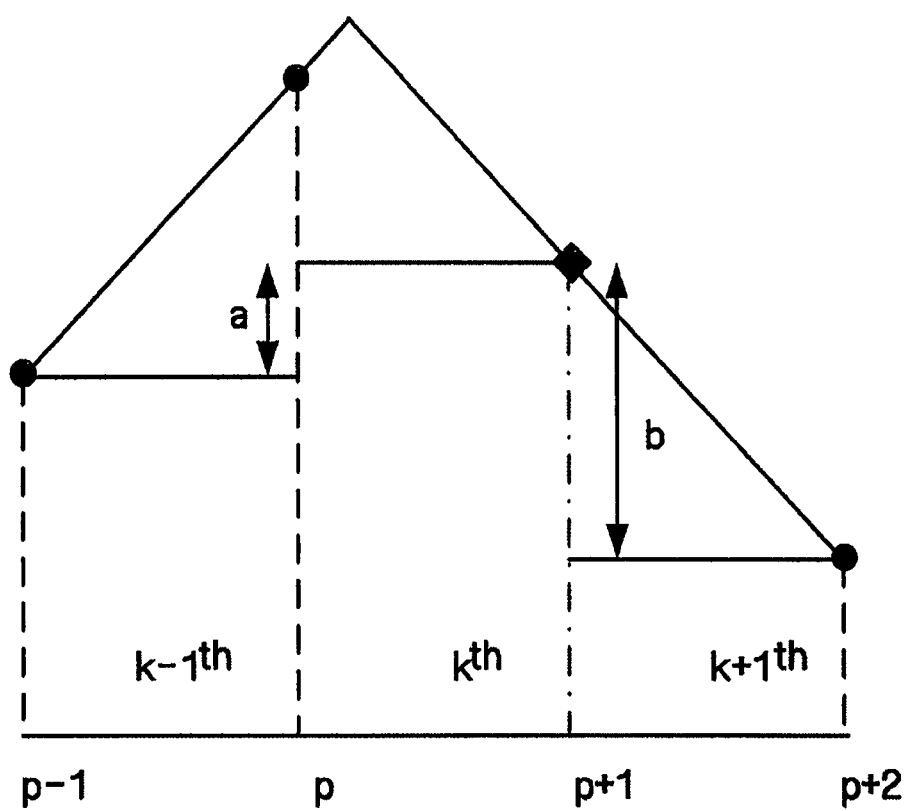
FIG. 15 illustrates a method of determining a sampling position through a linear model when sample values in sampling intervals (k−1), k and (k+1) show a convex shape according to an embodiment of the present invention.

More specifically, when an input signal is concave as illustrated in FIG. 15, (p−1) is position s(k−1) where sample value d(k−1) is obtained in sampling interval (k−1) and (p+1) is position s(k+1) where sample value d(k+1) is obtained in sampling interval (k+1). Accordingly, when an input signal is concave, symmetrical, and linear, position s(k) of sample value d(k) obtained in sampling interval k according to equation 3 below:

$$s(k) = \begin{cases} p, & \text{if } a > b \\ p+1, & \text{otherwise} \end{cases} \quad (3)$$

where a is the difference between sample value d(k−1) of sampling interval (k−1) and sample value d(k) of sampling interval k, and b is the difference between sample value d(k) of sampling interval k and sample value d(k+1) of sampling interval (k+1). Even if it is assumed that an input function is a high order model, if the function is a symmetrical function, the same result as equation 3 can be derived and thus equation 4 below is derived:

$$s(k) = \begin{cases} p, & \text{if } d(k-1) < d(k+1) \\ p+1, & \text{otherwise} \end{cases} \quad (4)$$

Meanwhile, FIGS. 8 through 12 illustrate cases where at least two or more identical sample values exist in sampling intervals (k−1), k and (k+1). Position s(k), where sample value d(k) is obtained in sampling interval k, can be determined according to sampling intervals at which identical sample values are obtained.

Meanwhile, as another embodiment of the present invention, when sampling interval k is an edge, the position determination unit 140 can determine position s(k) where sample value d(k) is obtained in sampling interval k, by changing the magnitudes of sample value d(k) in sampling interval k and sample value d(k−1) in sampling interval (k−1).

Figure 16:
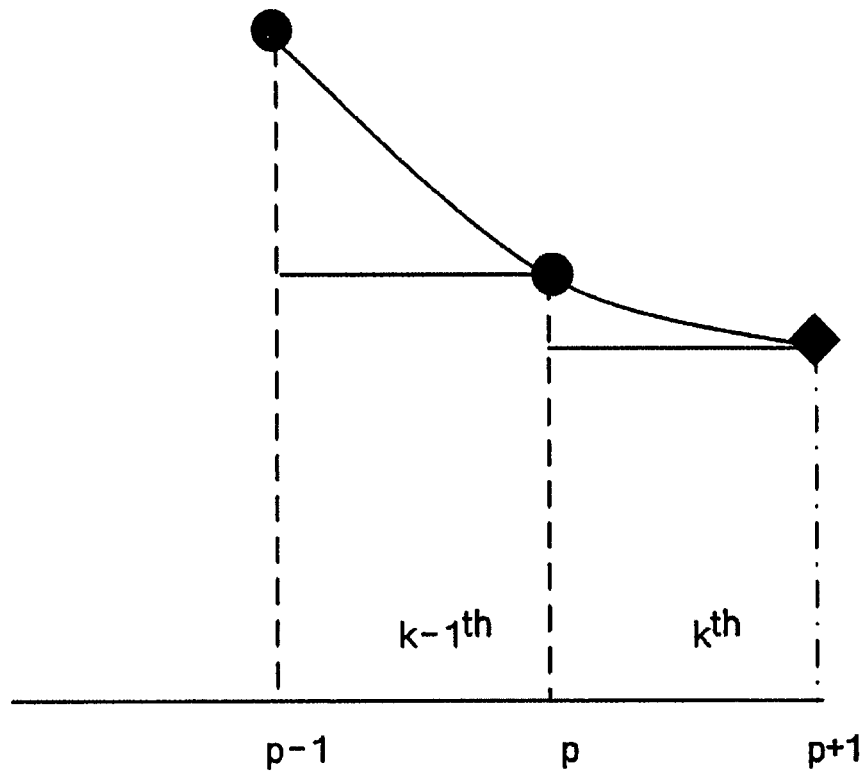
FIGS. 16 and 17 illustrate a method of determining a sampling position when a sampling interval k is an edge, according to an embodiment of the present invention.
Figure 17:
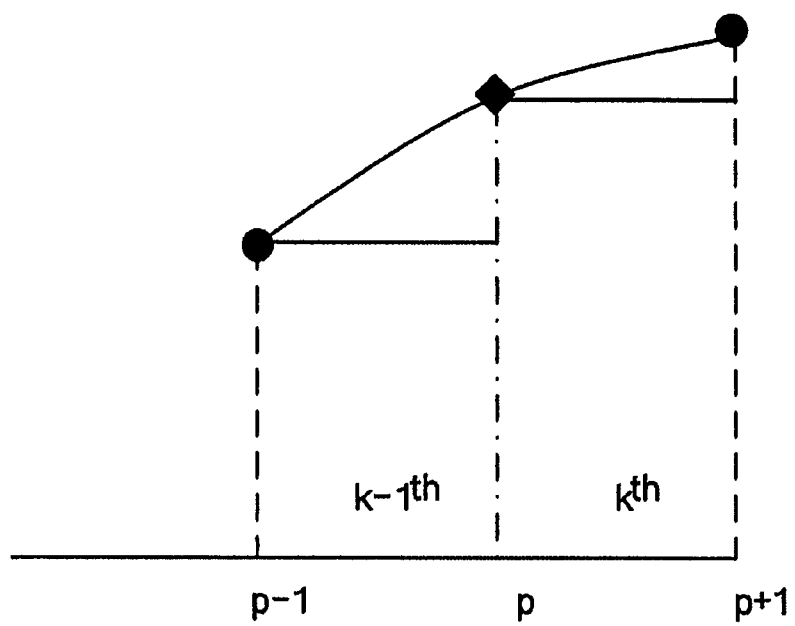

FIGS. 16 and 17 illustrate positions where sample values are obtained when sampling interval k is an edge, according to the embodiment of the present invention.

As illustrated in FIGS. 16 and 17, when sampling interval k is an edge, if sample value d(k−1) of sampling interval (k−1) is equal to or greater than sample value d(k) of sampling interval k, position s(k) where sample value d(k) is obtained in sampling interval k can be (p+1) or else position s(k) can be p.

Also, in another embodiment, when sampling interval (k+1) is an edge, the position determination unit 140 can determine position s(k) where sample value d(k) is obtained in sampling interval k, by changing the magnitudes of sample value d(k) in sampling interval k and sample value d(k+1) in sampling interval (k+1).

Figure 18:
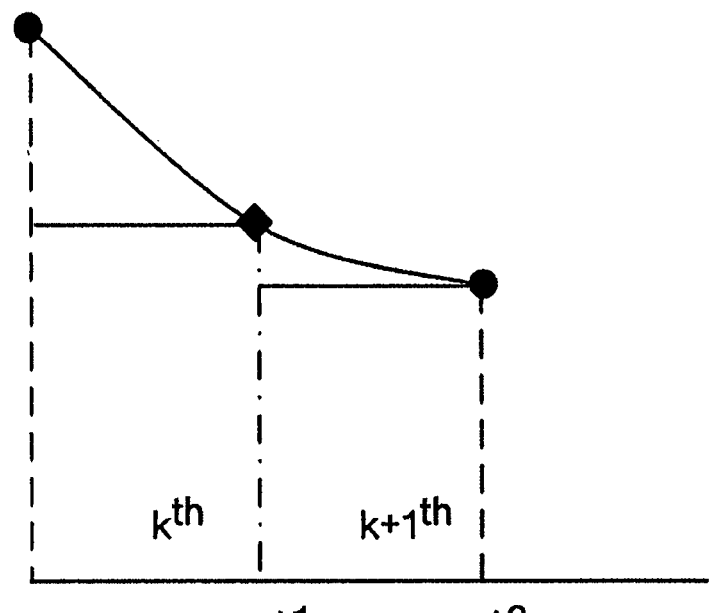
FIGS. 18 and 19 illustrate a method of determining a sampling position when a sampling interval (k+1) is an edge, according to an embodiment of the present invention.
Figure 19:
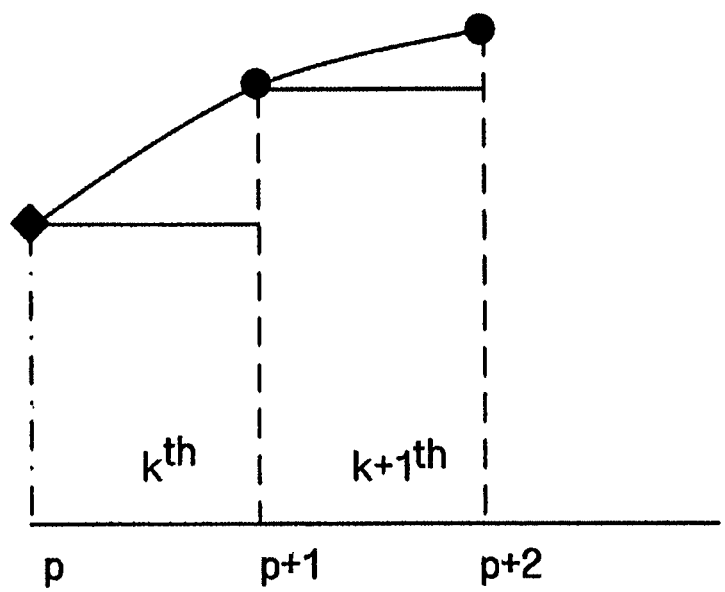

FIGS. 18 and 19 illustrate positions where sample values are obtained when sampling interval (k+1) is an edge, according to the embodiment of the present invention.

As illustrated in FIGS. 18 and 19, when sampling interval (k+1) is an edge, if sample value d(k) of sampling interval k is equal to or greater than sample value d(k+1) of sampling interval (k+1), position s(k) where sample value d(k) is obtained in sampling interval k can be (p+1) or else position s(k) can be p.

Accordingly, position s(k) where sample value d(k) is obtained in sampling interval k can be obtained as shown in Table 1 below according to the above three embodiments:

Meanwhile, the position determination unit 140 can store position s(k), which his where sample value d(k) is obtained in sampling interval k and is obtained according to the embodiments described above, in the storage unit 130 together with the sample value or in a separate storage medium. Storing the determined position together with a sample value in the storage unit 130 described above according to the embodiment of the present invention will now be explained with an example.

The restoration unit 150 can restore a signal according to the sample value and the position stored in the storage unit 130 described above. This restoration unit 150 may include a first restoration unit 151 restoring a signal with the sample value and the position stored in the storage unit 130 described above, and a second restoration unit 152 correcting an error occurring in the signal restored by the first restoration unit 151.

The first restoration unit 151 can restore a signal as illustrated in FIG. 20 based on a sample value and a position where the sample value is obtained in each sampling interval. Here, it can be seen that the signal restored based on the position where a sample value is obtained according to the embodiment of the present invention can be restored to be closer to the input signal than the signal restored assuming that a sample value is obtained at the center of a predetermined sampling interval according to the conventional technology.

If a part 20 having an error occurring at a position where a sample value is obtained exists, the second restoration unit 152 verifies the position of the sample value obtained in each sampling interval according to the conditions of table 1 illustrated above, and according to the verification result, can correct the error occurring in the signal restored in the first restoration unit 151.

For example, the second restoration unit 152 can correct the error 210 as illustrated in FIG. 20, through the verification process, and by correcting the error occurring in the signal restored in the first restoration unit 151, can restore a signal, including a corrected part 220, as illustrated in FIG. 21.

Meanwhile, the apparatus 100 to restore a signal using minimum value sampling according to the embodiment of the present invention is described above with reference to 1-dimensional (1 D) examples, but is not limited to these examples and can be applied to 2-dimensional (2D) or higher-

TABLE 1

| Condition | Position where a sample value is obtained |
|---|---|
| d(k − 1) < d(k) < d(k + 1) | s(k) = p |
| d(k − 1) > d(k) > d(k + 1) | s(k) = p + 1 |
| d(k − 1) > d(k) < d(k + 1) | $s(k) = p + \dfrac{\sqrt[n]{d(k-1) - d(k)}}{\sqrt[n]{d(k-1) - d(k)} + \sqrt[n]{d(k+1) - d(k)}}$ |
| d(k − 1) < d(k) > d(k + 1) | $s(k) = \begin{cases} p, & \text{if } d(k-1) < d(k+1) \\ p+1, & \text{otherwise} \end{cases}$ |
| d(k − 1) < d(k) = d(k + 1) | s(k) = p |
| d(k − 1) > d(k) = d(k + 1) | s(k) = p + 1 |
| d(k − 1) = d(k) > d(k + 1) | s(k) = p + 1 |
| d(k − 1) = d(k) < d(k + 1) | s(k) = p |
| d(k − 1) = d(k) = d(k + 1) | s(k) = p (or p + 1) |
| d(k) >= d(k + 1) | s(k) = p + 1 |
| d(k) < d(k + 1) | s(k) = p |
| d(k − 1) >= d(k) | s(k) = p + 1 |
| d(k − 1) < d(k) | s(k) = p | order signals in a similar manner. A 2D embodiment of the present invention will now be explained with reference to examples.

FIGS. 22A through 22D illustrate a position of a sample value determined on a 2D plane according to an embodiment of the present invention.

Figure 22C:
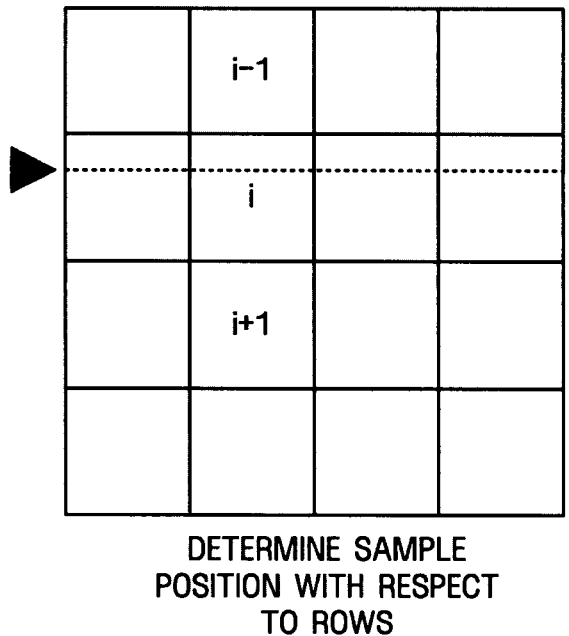
Figure 22D:
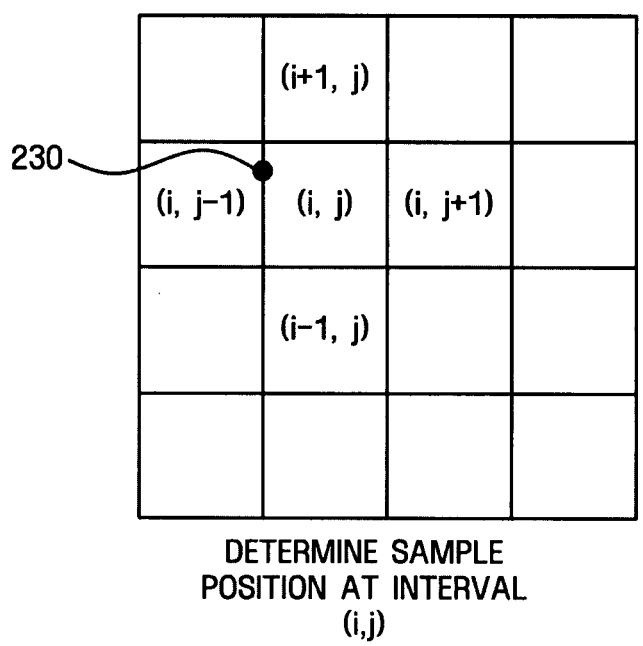

As illustrated in FIG. 22, in the case of 2D plane, sample values of intervals (i−1,j), (i,j−1), (i,j+1) and (i+1,j) are used in order to determine the position of a sample value obtained in interval (i,j). More specifically, in order to determine the position of the sample value obtained in interval (i,j), the position within columns is determined as illustrated in FIG. 22B and the position at rows is determined as illustrated in FIG. 22C. Then, a position 230 where the column and the row intersect can be determined from the position obtained from interval (i,j) as illustrated in FIG. 22D.

Figure 23:
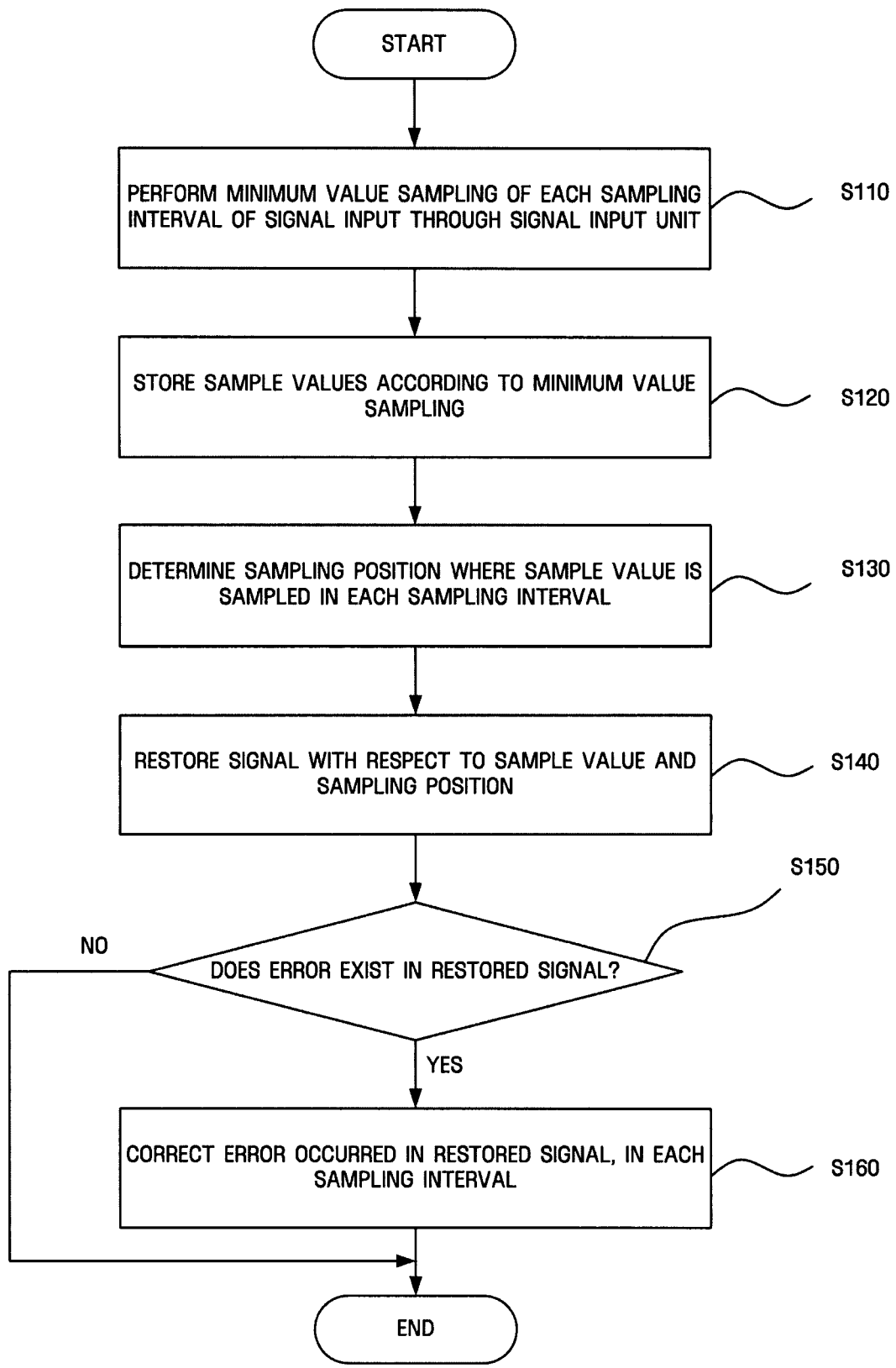
FIG. 23 is a flowchart illustrating a method of restoring a signal using minimum value sampling according to an embodiment of the present invention.

FIG. 23 is a flowchart illustrating a method of restoring a signal using minimum value sampling according to an embodiment of the present invention.

As illustrated in FIG. 23, according to the method of restoring a signal using minimum value sampling according to the embodiment of the present invention, first, minimum value sampling of an input signal input through the signal unit 110 is performed in the sampling unit 120 with respect to each predetermined sampling interval in operation S110. At this time, according to the minimum value sampling performed in the sampling unit 120, a ray having a shortest TOF among rays returning after being reflected by the subject is selected in relation to each pixel.

The sample value sampled in the sampling unit 120 is stored in the storage unit 130 in operation S120. The position determination unit 140 determines the sampling position of the sample value in each predetermined sampling interval in operation S130. More specifically, according to the embodiments described above, the position determination 140 may determine the sampling position of a sample value in sampling interval k through changing the magnitudes of sample values in sampling intervals (k−1) and (k+1) in relation to sampling interval k, or if sampling interval k is an edge, the position determination unit 140 may determine the sampling position of a sample value in sampling interval k through changing the magnitude of a sample value in sampling interval (k−1), or if sampling interval (k+1) is an edge, the position determination unit 140 may determine the sampling position of a sample value in sampling interval k through changing the magnitude of a sample value in sampling interval k.

The first restoration unit 151 restores a signal based on the sample value stored in the storage unit 130 and the sampling position of the sample value determined in the position determination unit 140.

The second restoration unit 152 verifies the signal restored by the first restoration unit 151 according to the conditions of table 1 illustrated above in operation S150, and if the verification result indicates that an error exists in operation S160, the error is corrected in operation S170.

Meanwhile, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to the apparatus and method of restoring a signal using minimum value sampling according to the embodiments of the present invention as described above, a signal is restored by determining the position of a sample value obtained through minimum value sampling in each sampling interval, and thus deterioration caused by aliasing occurring due to the minimum value sampling of the original signal can be effectively prevented.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to restore an input signal using minimum value sampling, the apparatus comprising:
a sampling unit to sample a minimum value sampling of the input signal;
a storage unit to store a sample value obtained through the minimum value sampling of the input signal in a predetermined sampling interval;
a position determination unit to determine the position of the sample value in the sampling interval; and
a restoration unit to restore the input signal using the stored sample value with respect to the determined position, wherein the position determination unit determines the position of the sample value in sampling interval k by changing the magnitudes of d(k), d(k−1) and d(k+1), which are sample values in sampling intervals k, (k−1) and (k+1), respectively.

2. The apparatus of claim 1, wherein if sampling interval k is formed of p and (p+1) and if d(k−1)<d(k)<d(k+1), the position determination unit determines the sample value in sampling interval k to be p.

3. The apparatus of claim 1, wherein if sampling interval k is formed of p and (p+1) and if d(k−1)>d(k)>d(k+1), the position determination unit determines the sample value in sampling interval k to be (p+1).

4. The apparatus of claim 1, wherein if sampling interval k is formed of p and (p+1) and if d(k−1)>d(k)>d(k+1), the position determination unit determines the sample value in sampling interval k to be $$p + \frac{\sqrt[n]{d(k-1) - d(k)}}{\sqrt[n]{d(k-1) - d(k)} + \sqrt[n]{d(k+1) - d(k)}}.$$

5. The apparatus of claim 1, wherein if sampling interval k is formed of p and (p+1) and if d(k−1)<d(k)>d(k+1) and d(k−1)<d(k+1), the position determination unit determines the sample value in sampling interval k to be p, or else the position determination unit determines the sample value in sampling interval k to be (p+1).

6. The apparatus of claim 1, wherein if sampling interval k is formed of p and (p+1) and if d(k−1)<d(k)=d(k+1), the position determination unit determines the sample value in sampling interval k to be p.

7. The apparatus of claim 1, wherein if sampling interval k is formed of p and (p+1) and if d(k−1)>d(k)=d(k+1), the position determination unit determines the sample value in sampling interval k to be (p+1).

8. The apparatus of claim 1, wherein if sampling interval k is formed of p and (p+1) and if d(k−1)=d(k)>d(k+1), the position determination unit determines the sample value in sampling interval k to be (p+1).

9. The apparatus of claim 1, wherein if sampling interval k is formed of p and (p+1) and if d(k−1)=d(k)<d(k+1), the position determination unit determines the sample value in sampling interval k to be p.

10. The apparatus of claim 1, wherein if sampling interval k is formed of p and (p+1) and if d(k−1)=d(k)=d(k+1), the position determination unit determines the sample value in sampling interval k to be p or (p+1).

11. The apparatus of claim 1, wherein if sampling interval k is an edge of the input signal, the position determination unit determines the position of a sample value in sampling interval k through changing the magnitude of d(k), which is the sample value in sampling interval k, and the magnitude of d(k−1), which is the sample value in sampling interval (k−1).

12. The apparatus of claim 11, wherein if sampling interval k is formed of p and (p+1) and if d(k−1)≥d(k), the position determination unit determines (p+1) as the sample value in sampling interval k.

13. The apparatus of claim 11, wherein if sampling interval k is formed of p and (p+1) and if d(k−1)<d(k), the position determination unit determines p as the sample value in sampling interval k.

14. The apparatus of claim 1, wherein if sampling interval (k+1) that is the sampling interval next to sampling interval k is an edge of the input signal, the position determination unit determines the position of a sample value in sampling interval k by changing the magnitude of d(k), which is the sample value in sampling interval k, and the magnitude of d(k+1), which is the sample value in sampling interval (k+1).

15. The apparatus of claim 14, wherein if sampling interval k is formed of p and (p+1) and if d(k)≥d(k+1), the position determination unit determines the sample value in sampling interval k to be (p+1).

16. The apparatus of claim 14, wherein if sampling interval k is formed of p and (p+1) and if d(k−1)<d(k), the position determination unit determines the sample value in sampling interval k to be p.

17. The apparatus of claim 1, the apparatus further comprising:
a sampling unit to sample an input signal minimum value of sampling of the input signal.

18. The apparatus of claim 1, wherein the restoration unit comprises:
a first restoration unit to restore the input signal according to the position of the determined sample value.

19. The apparatus of claim 18, wherein the restoration unit further comprises:
a second restoration unit to correct an error occurring in the signal restored by the first restoration unit.

20. The apparatus of claim 19, wherein if an error occurs in the restored signal, the second restoration unit corrects the error by verifying the minimum value sampling performed in each sampling interval.

21. A method of restoring a signal using minimum value sampling, the method comprising:
storing a sample value obtained through the minimum value sampling of an input signal in a predetermined sampling interval, to a storing unit,
determining, by a processor, the position of the sample value in the sampling interval; and
restoring the input signal using the stored sample value with respect to the determined position to the storing unit, wherein the determining of the position of the sample value comprises determining the position of the sample value in sampling interval k by changing the magnitudes of d(k), d(k−1) and d(k+1), which are sample values in sampling intervals k, (k−1) and (k+1), respectively.

22. The method of claim 21, wherein if sampling interval k is formed of p and (p+1) and if d(k−1)<d(k)<d(k+1), the determining of the position of the sample value comprises determining the sample value in sampling interval k to be p.

23. The method of claim 21, wherein if sampling interval k is formed of p and (p+1) and if d(k−1)>d(k)>d(k+1), the determining of the position of the sample value comprises determining the sample value in sampling interval k to be (p+1).

24. The method of claim 21, wherein if sampling interval k is formed of p and (p+1) and if d(k−1)>d(k)>d(k+1), the determining of the position of the sample value comprises determining the sample value in sampling interval k to be $$p + \frac{\sqrt[n]{d(k-1)-d(k)}}{\sqrt[n]{d(k-1)-d(k)} + \sqrt[n]{d(k+1)-d(k)}}.$$

25. The method of claim 21, wherein if sampling interval k is formed of p and (p+1) and if d(k−1)<d(k)>d(k+1) and d(k−1)<d(k+1), the determining of the position of the sample value comprises determining the sample value in sampling interval k to be p, or else determining the sample value in sampling interval k to be (p+1).

26. The method of claim 21, wherein if sampling interval k is formed of p and (p+1) and if d(k−1)<d(k)=d(k+1), the determining of the position of the sample value comprises determining the sample value in sampling interval k to be p.

27. The method of claim 21, wherein if sampling interval k is formed of p and (p+1) and if d(k−1)>d(k)=d(k+1), the determining of the position of the sample value comprises determining the sample value in sampling interval k to be (p+1).

28. The method of claim 21, wherein if sampling interval k is formed of p and (p+1) and if d(k−1)=d(k)>d(k+1), the determining of the position of the sample value comprises determining the sample value in sampling interval k to be (p+1).

29. The method of claim 21, wherein if sampling interval k is formed of p and (p+1) and if d(k−1)=d(k)<d(k+1), the determining of the position of the sample value comprises determining the sample value in sampling interval k to be p.

30. The method of claim 21, wherein if sampling interval k is formed of p and (p+1) and if d(k−1)=d(k)=d(k+1), the determining of the position of the sample value comprises determining the sample value in sampling interval k to be p or (p+1).

31. The method of claim 21, wherein if sampling interval k is an edge of the input signal, the determining of the position of the sample value comprises determining the position of a sample value in sampling interval k through changing the magnitude of d(k), which is the sample value in sampling interval k, and the magnitude of d(k−1), which is the sample value in sampling interval (k−1).

32. The method of claim 31, wherein if sampling interval k is formed of p and (p+1) and if d(k−1)≥d(k), the determining of the position of the sample value comprises determining (p+1) as the sample value in sampling interval k.

33. The method of claim 31, wherein if sampling interval k is formed of p and (p+1) and if d(k−1)<d(k), the determining of the position of the sample value comprises determining p as the sample value in sampling interval k.

34. The method of claim 21, wherein if sampling interval (k+1) that is the sampling interval next to sampling interval k is an edge of the input signal, the determining of the position of the sample value comprises determining the position of a sample value in sampling interval k by changing the magnitude of d(k), which is the sample value in sampling interval k, and the magnitude of d(k+1), which is the sample value in sampling interval (k+1).

35. The method of claim 32, wherein if sampling interval k is formed of p and (p+1) and if d(k−1)≥d(k), the determining of the position of the sample value comprises determining the sample value in sampling interval k to be (p+1).

36. The method of claim 34, wherein if sampling interval k is formed of p and (p+1) and if d(k−1)<d(k), the determining of the position of the sample value comprises determining the sample value in sampling interval k to be p.

37. The method of claim 21, wherein the restoring of the input signal comprises:
restoring the input signal with respect to the determined position of the sample value.

38. The method of claim 21, wherein the restoring of the input signal further comprises:
if an error occurs in the restored signal correcting the error occurring in the restored signal by.

39. The method of claim 38, wherein the correcting the error is by verifying the minimum value sampling performed in each predetermined sampling interval.

* * * * *